(12) United States Patent
Braud et al.

(10) Patent No.: US 10,896,170 B2
(45) Date of Patent: Jan. 19, 2021

(54) AUTOMATED WORKFLOW INTEGRATION OF DATA FROM MULTIPLE DATA SOURCES

(71) Applicant: Microsoft Technology Licensing, LLC, Redmond, CA (US)

(72) Inventors: Luke Braud, Truckee, CA (US); Derek E. Lyons, El Cerrito, CA (US); Christian Marenbach, San Francisco, CA (US); Baran Salih Nohutcuoglu, San Francisco, CA (US); Vikram H. Patil, Belmont, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 388 days.

(21) Appl. No.: 15/853,226

(22) Filed: Dec. 22, 2017

(65) Prior Publication Data

US 2019/0197150 A1 Jun. 27, 2019

(51) Int. Cl.
| | | |
|---|---|---|
| *G06F 16/00* | (2019.01) | |
| *G06F 16/23* | (2019.01) | |
| *G06F 21/60* | (2013.01) | |
| *G06F 16/21* | (2019.01) | |
| *G06F 16/951* | (2019.01) | |
| *G06F 16/903* | (2019.01) | |
| *G06F 3/0486* | (2013.01) | |

(52) U.S. Cl.
CPC ........ *G06F 16/2379* (2019.01); *G06F 16/219* (2019.01); *G06F 16/90335* (2019.01); *G06F 16/951* (2019.01); *G06F 21/604* (2013.01); *G06F 3/0486* (2013.01)

(58) Field of Classification Search
CPC .... G06F 3/0486; G06F 21/604; G06F 16/951; G06F 16/2379; G06F 16/219; G06F 16/90335
See application file for complete search history.

(56) References Cited

U.S. PATENT DOCUMENTS

| | | | | |
|---|---|---|---|---|
| 7,574,652 | B2* | 8/2009 | Lennon | G06F 16/258 |
| | | | | 715/248 |
| 7,644,361 | B2* | 1/2010 | Wu | G06F 16/90324 |
| | | | | 715/273 |
| 9,832,156 | B2* | 11/2017 | Lai | H04L 51/32 |
| 2004/0015783 | A1* | 1/2004 | Lennon | G06F 16/258 |
| | | | | 715/235 |
| 2004/0181543 | A1* | 9/2004 | Wu | G06F 16/26 |
| 2005/0065980 | A1* | 3/2005 | Hyatt | G06F 16/22 |
| 2009/0150431 | A1* | 6/2009 | Schmidt | G06F 16/284 |
| 2009/0150906 | A1* | 6/2009 | Schmidt | G06Q 10/00 |
| | | | | 719/317 |
| 2012/0210247 | A1* | 8/2012 | Khouri | G06Q 10/101 |
| | | | | 715/751 |

(Continued)

*Primary Examiner* — Shiow-Jy Fan
(74) *Attorney, Agent, or Firm* — Hickman Palermo Becker Bingham LLP; Christine E. Orich

(57) ABSTRACT

Techniques for integrating data from multiple data sources with a transaction-related workflow are provided. The disclosed techniques include, in response to determining that a contact record was retrieved from a second data source, concurrently with the assigning of a role to the contact record, instantiating a version of the contact record in a first data source using data obtained from the second data source.

20 Claims, 6 Drawing Sheets

(56) References Cited

U.S. PATENT DOCUMENTS

| | | | | |
|---|---|---|---|---|
| 2013/0080411 A1* | 3/2013 | Rolia | .................... | G06Q 10/10 707/694 |
| 2013/0254397 A1* | 9/2013 | Lai | ....................... | G06Q 50/01 709/225 |
| 2014/0101149 A1* | 4/2014 | Winters | ................ | G06F 16/958 707/736 |
| 2014/0149592 A1* | 5/2014 | Krishna | ................. | G06F 1/329 709/226 |
| 2014/0236663 A1* | 8/2014 | Smith | ................ | G06Q 10/0633 705/7.27 |
| 2014/0379400 A1* | 12/2014 | Bailey | ............. | G06Q 10/06316 705/7.15 |
| 2016/0057094 A1* | 2/2016 | Gvelesiani | ............. | H04L 51/32 715/753 |
| 2019/0197456 A1* | 6/2019 | Perumal | ........... | G06Q 10/06398 |

* cited by examiner

AUTOMATED WORKFLOW INTEGRATION OF DATA FROM MULTIPLE DATA SOURCES

TECHNICAL FIELD

The present disclosure relates to transaction management systems, and more particularly to techniques for integrating data from multiple data sources with transaction-related workflows.

BACKGROUND

Data integration technologies can combine and store data from multiple data sources. Combining data obtained from multiple data sources in a way that enables seamless interactions, efficient storage and meaningful presentations of the data is an ongoing challenge for data integration systems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Technologies for integrating data from multiple data sources with transaction-related workflows are provided. In one approach, data records from multiple data sources, such as a social graph maintained by a social network service provider and a CRM database, are associated with a transaction-related workflow. The transaction-related workflow may be associated with sales-related technologies such as marketing, lead generation, and/or sales automation technologies.

In an approach, the system executes one or more queries to retrieve contact records from at least two heterogeneous data sources, where the one or more queries are contextualized based on an entity identifier associated with a sales-related workflow.

In an approach, the system causes displaying in a display device a view of a subset of contact records including contact records retrieved from heterogeneous data sources.

In an approach, the system concurrently assigns a role to a contact record of the displayed contact records and instantiates a version of the contact record in a data source from which the contact record was not retrieved.

Approaches described herein address the technical problem of integrating contact data from heterogeneous data sources with transaction-related workflows implemented in a computing system. The disclosed approaches improve upon known systems by contextualizing queries that are used to retrieve contact data from the heterogeneous data sources and by using layered caching techniques to synchronize updates to the data sources.

As a result, data integration processes executed by the computing system can include data records that are more likely to be relevant to a current workflow while excluding data records that are less likely to be pertinent to the current workflow, thereby reducing the amount of data processing performed by the computing system, increasing the accuracy and completeness of data that is associated with the workflow, and improving the speed at which contact records from multiple data sources can be integrated with transaction-related workflows. These improvements can help facilitate the use of a central CRM repository for storage of workflow-related data updates.

System Overview

Figure 1:
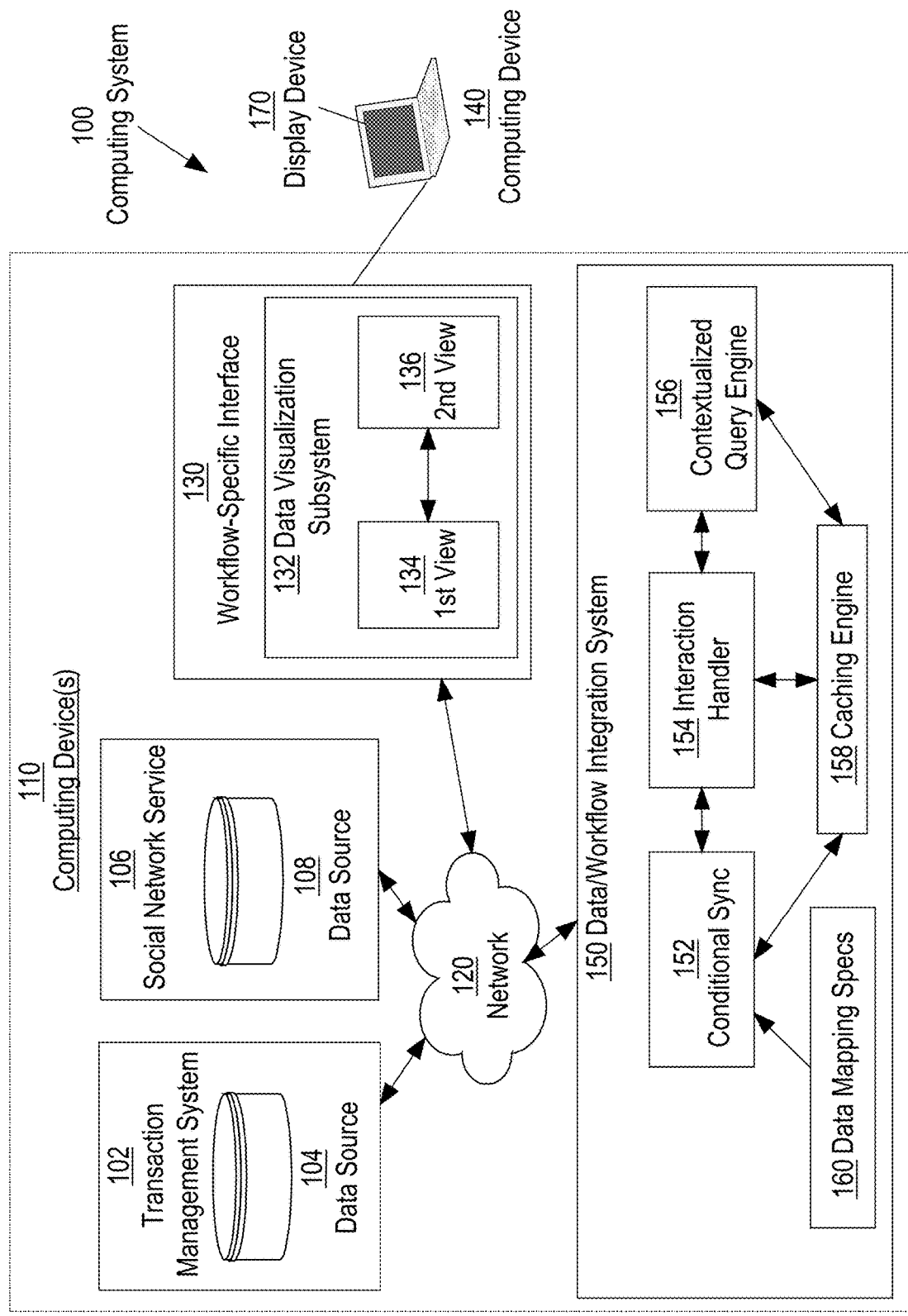
FIG. 1 is a block diagram that depicts an example system for obtaining and integrating data from multiple data sources with a transaction-related workflow, in an embodiment.

FIG. 1 is a block diagram that depicts an example computing system 100 arranged to obtain data from multiple data sources and integrate portions of the obtained data with transaction-related workflows, in an embodiment. Computing system 100 includes computing device(s) 110, computing device 140, and display device 170, which are communicatively coupled to an electronic communications network 120.

Implemented in the devices 110, 140, 170 using computer software, hardware, or software and hardware, are combinations of automated functionality embodied in computer programming code, data structures, and digital data, which are represented schematically in FIG. 1 as transaction management system 102, data source 104, social network service 106, data source 108, workflow-specific interface 130, data visualization subsystem 132 (which can generate first view 134 and second view 136), and data/workflow integration system 150. Data/workflow integration system 150 includes a conditional sync module 152, an interaction handler 154, a contextualized query engine 156, a caching engine 158, and a set of data mapping specifications 160. System as used in this disclosure may refer to a single computer or network of computers and/or other devices. Computing device as used in this disclosure may refer to a computer or any other electronic device that is equipped with a processor.

Although computing system 100 may be implemented with any number N (where N is a positive integer) of transaction management system 102, data source 104, social network service 106, data source 108, workflow-specific interface 130, data/workflow integration system 150, computing devices 110, display devices 170 and computing devices 140, respectively, in this disclosure, these elements may be referred to in the singular form for ease of discussion.

Also, transaction management system 102, data source 104, social network service 106, data source 108, workflow-specific interface 130, data/workflow integration system 150 are shown as separate elements in FIG. 1 for ease of discussion but the illustration is not meant to imply that separation of these elements is required. The illustrated systems (or their functionality) may be divided over any number of physical systems, including a single physical computer system, and can communicate with each other in any appropriate manner.

The illustrative transaction management system 102, social network service 106, workflow-specific interface 130 and data/workflow integration system 150 are communicatively coupled to computing device 140 and to network 120. Portions of illustrative transaction management system 102, social network service 106, workflow-specific interface 130 and data/workflow integration system 150 may be implemented as web-based software applications and hosted by a hosting service (not shown). For example, workflow-specific interface 130 and data/workflow integration system 150 may be implemented as front-end and back-end portions of a social selling platform, respectively. In an embodiment, portions of workflow-specific interface 130 are implemented in a web browser that can be execute on computing device 140.

In some embodiments, computing device 140 is a client computing device, such as an end user's smart phone, tablet, wearable, or laptop machine, and computing device 110 is a server computer or network of server computers located on the Internet, in the cloud. As illustrated in FIG. 1, display device 170 is implemented in computing device 140 but may be implemented as a separate device or as part of another device, or as multiple networked display devices, in other implementations.

The example transaction management system 102 is a database system (such as a CRM database system) that stores and manages information about users or sales prospects to which sales of one or more products or services are intended to be made in a searchable compilation of information. The stored information may comprise numerous data records, where each data record may indicate a person or entity name, an address, a phone number, an email address, an IM address, a web address, an employer name, a job title, an activity log, etc.

As used in this disclosure, 'transaction management system' may refer to a customer relationship management (CRM) system or a similar or related technology. CRM systems include software platforms that are designed to manage and analyze interactions between representatives of supplier entities and customer entities for the purpose of developing relationships between the supplier and customer entities. A supplier may include any person or organization having a product or service to offer for consumption. A customer may include any person or organization that may be willing to consume a product or service offered by a supplier.

Social network services include online platforms that can be used to build relationships between entities (such as people and business organizations) using a social graph. Social selling technologies include software platforms that leverage online social networks to facilitate sales-related activities, such as lead generation and pre-sales activities. In some implementations, a CRM system or a social network service may include portions of a social selling technology. In other implementations, a social selling technology may include portions of a CRM system or a social network service.

'Transaction,' as used herein, may refer to an actual or prospective business transaction involving one or more entities and one or more representatives of each entity. A representative of an entity involved in a transaction may be referred to herein as a 'contact.' A 'workflow,' as used herein, may refer to one or more online tasks or activities that are associated with a transaction. For example, a workflow may include activities such as 'add contact to database,' 'assign role to contact,' 'send calendar invitation to contact,' etc. Examples of roles that may be assigned to a contact include 'influencer,' 'decision maker,' 'technical lead,' 'project champion,' and the like. Activities in a workflow may be performed by the computing system autonomously or at the direction of a user of the computing system.

The information maintained by transaction management system 102 is stored in data source 104, which may be implemented using a conventional table-based relational or hierarchical database structure or an ontology. To accommodate a wide variety of needs of a large number of end users and workflows, data source 104 may be implemented using a data structure (such as a table or data object) that has a very large number of data fields or attributes. For instance, data source 104 may be implemented using a table named 'transaction' that has many pages of data fields or attributes, where each field or attribute has a label (such as transaction ID, entity name, contact name, etc.).

An instance of transaction data is created when data relating to a particular transaction is stored in the table (where the instance includes data values populating one or more of the fields in the table). The data source 104 can be searched using a query language (such as the structured query language or SQL) to find contacts that may be relevant to a transaction. Searching of data source 104 can be performed by transaction management system 102 cooperating with contextualized query engine 156, for example by application programming interface (API) calls.

Social network service 106 is a computer-implemented service that maintains and updates data source 108, which may be implemented as a social graph or a connection graph. As used herein, a social graph may refer to a data structure that is used to create data objects and relationships between data objects, where data objects are represented by nodes in the graph and relationships between data objects are represented by edges in the graph.

An edge between two nodes indicates that a 'connection' has been made between the two nodes connected by the edge, where the nodes represent contacts (people or entities, for example). The social graph can be traversed by computer-implemented algorithms to find contacts that may be relevant to a transaction. Such traversals can be performed by the social network service 106 and a detailed description of the social network technology is beyond the scope of this disclosure.

Social network service 106 can be implemented as an online social network of contact data that allows users (operating electronic devices) to register with social network service 106, create contact data (for example, profiles), establish connections with other registered users or members, and perform other actions, such as message other members, post articles, view postings from other members, comment on postings, "like" postings, endorse other members or established connections, etc. A user or member profile may include a name of the member, a job title, a job industry, academic institutions attended, employment status, previous and current employers, skills, endorsements from other members, contact information, address information, etc.

Data sources 104, 108 can be said to be 'heterogeneous' when they are of different types or formats, as is typically the case when data source 104 is implemented as a database and data source 108 is implemented as a social graph. However, data sources 104, 108 are both searchable using, for instance, different querying techniques exposed by transaction management system 102 and social network service 106, respectively, for example by application programming interfaces (APIs).

Network 120 may be implemented on any medium or mechanism that provides for the exchange of data between the devices that are connected to the network. Examples of network 120 include, without limitation, a network such as a Local Area Network (LAN), Wide Area Network (WAN), Ethernet or the Internet, or one or more terrestrial, satellite or wireless links.

Computing device 140 operates workflow-specific interface 130 to establish logical connection(s) over network 120 with portions of transaction management system 102 and social network service 106, either directly or via data/workflow integration system 150. Data visualization subsystem 132 displays data retrieved from data sources 104, 108 and/or additional information, in at least two views 134, 136. A view as used herein may refer to a window of a graphical user interface (GUI), or a portion of a window, such as a text display box, an image, a graphical element, or any combination of GUI elements. For example, switching between the views 134, 136 may or may not involve a context switch.

Workflow-specific interface 130 is programmed to extract and display a subset of the data (data values) and metadata (data field or object names) that is stored in data source 104 and managed by transaction management system 102. The subset of data that is exposed for viewing and manipulation by workflow-specific interface 130 relates to a particular workflow or type of workflow that is established in transaction management system 102 and which is associated with a particular transaction (such as a sales opportunity).

For instance, a workflow for a sales representative's prospecting activity can be associated with a subset of the entire data source 104 that is particularly relevant to a 'prospecting activity' workflow. This subset of data may include only certain fields or attributes of the 'transaction' table or data object of data source 104, for example, entity name, contact name, project stage, last activity. As described in more detail below, these associations between data, workflows, and transactions can be implemented using data mapping specifications 160. Accordingly, workflow-specific interface 130 and/or data/workflow integration system 150 can be implemented as one or more separate modules that are not part of transaction management system 102.

Components of data/workflow integration system 150 operate to control the data that is displayed by data visualization subsystem 132 and to control data updates that are made to data source 104. Interaction handler 154 detects and processes inputs received by computing system 100 as a result of an end user's interactions with workflow-specific interface 130, for example interactions with the views 134, 136. For instance, interaction handler 154 may detect activation of a user interface element, selection of a data record, or switching from first view 134 to second view 136 (or vice versa). Interaction handler 154 is programmed with logic for interpreting the interaction and determining the appropriate action(s) to be performed by computing system 100 in response to the detected interaction.

In one example, interaction handler 154 may cooperate with caching engine 158 to temporarily store one or more previously retrieved data values in cache memory (for example, a data value retrieved from a CRM data base or data source 104, which is displayed in view 134). Then, in response to another interaction (such as an interaction with a graphical element of view 134), interaction handler 154 can cause contextualized query engine 156 to formulate and execute one or more search queries of data source 104 and/or data source 108 while including the one or more data values retrieved from cache memory as search term(s) or parameter(s) of the search query.

In another example, interaction handler 154 may cooperate with conditional sync module 152 to either cause updating of a view 134, 136 in response to a data change made in data source 104 by transaction management system 102 or to cause updating of data source 104 in response to an interaction or a data change (including new inputs) detected by workflow-specific interface 130 via one or more of views 124, 136.

For example, an update made to a data value in data source 104 (such as adding a new row to a database) is reflected in view 134 or view 136 as a result of cooperation of conditional sync module 152 with interaction handler 154. In another example, an update made to meta data in data source 104 (such as adding a new column to data base 104) is reflected in view 134 or view 136 as a result of cooperation between conditional sync module 152 and interaction handler 154. In still another example, conditional sync module 152 causes updating of data source 104 when interaction handler 154 detects a change to a data value (such as assignment of a role to a contact record) in view 134 or view 136.

When, for instance, interaction handler 154 detects assignment of a role to a contact record that was retrieved from data source 108, in view 136, conditional sync module 152 causes a new contact record to be created in data source 104 containing the information about the assigned role. If the contact record to which a role is assigned in view 136 was retrieved from data source 104, conditional sync module 152 causes updating of the corresponding contact record in data source 104 to include the assigned role but may not create a new contact record in data source 104.

Data mapping specifications 160 may be implemented as, for example a table or a set of rules implemented in computer programming logic. For instance, an entry in the mapping specifications 160 may associate a field name and/or set of data values in data source 104 with a field name and/or set of data values to be displayed in view 134 or view 136. Another entry in the mapping specifications 160 may associate a field name and/or set of data values in data source 108 with a field name and/or set of data values to be displayed in view 134 or view 136. Yet another entry in the mapping specifications 160 may associate a field name and/or set of data values in data source 108 with a field name and/or set of data values in data source 104.

Use of the disclosed approach enables a domain-specific term (such as a business- or use case-specific word or phrase) to be displayed to the user in workflow-specific interface 130 but mapped to the correct corresponding field name/label in the underlying data sources (102, 106). Thus, the user can manipulate the data using the terminology and concepts with which they are familiar, while the mapping layer takes care of translating terms for the underlying data sources.

Process Overview

Figure 2:
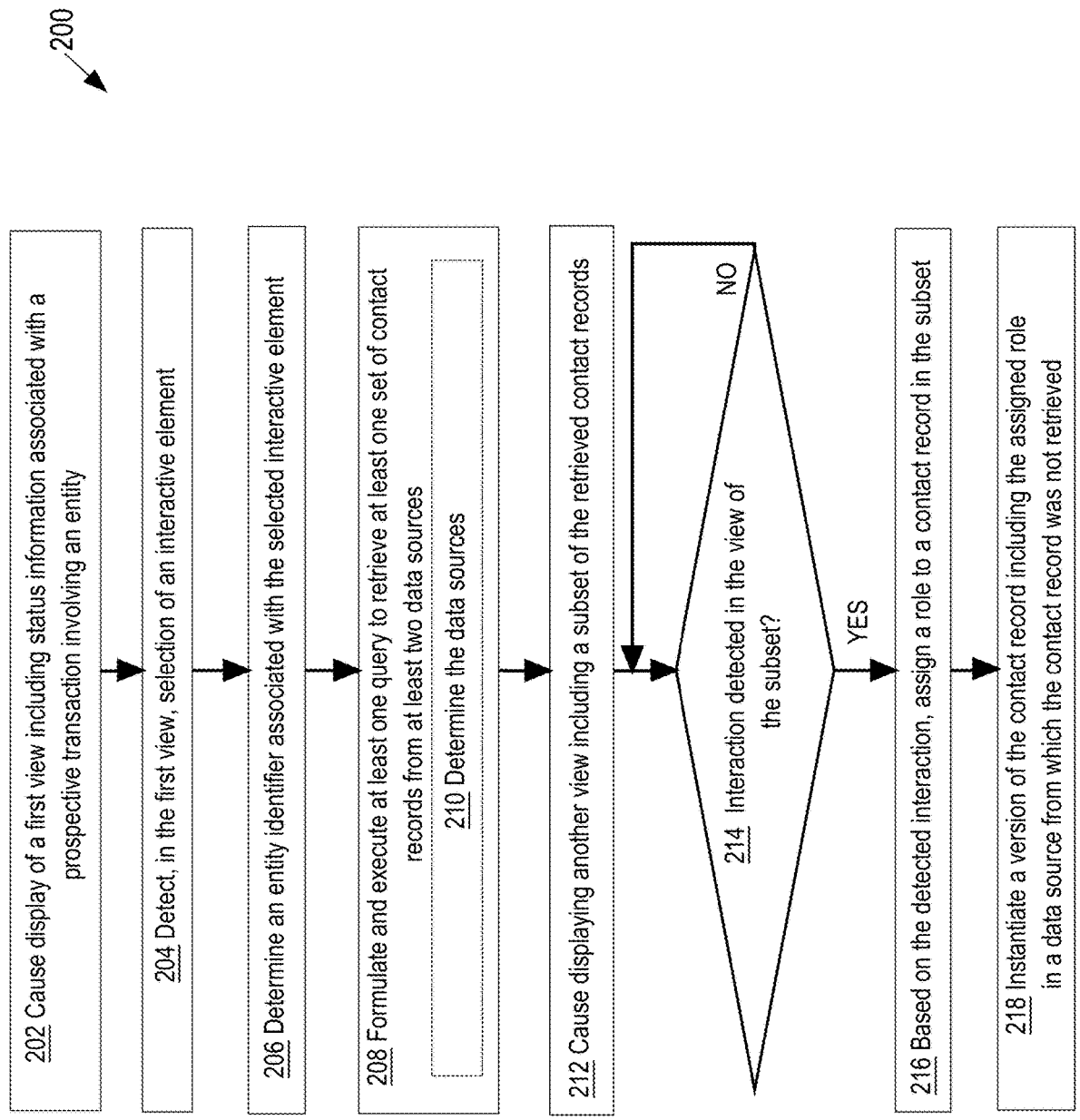
FIG. 2 is flow diagram that depicts a process for retrieving data from multiple sources and associating some of the retrieved data with a workflow, in an embodiment.
Figure 3:
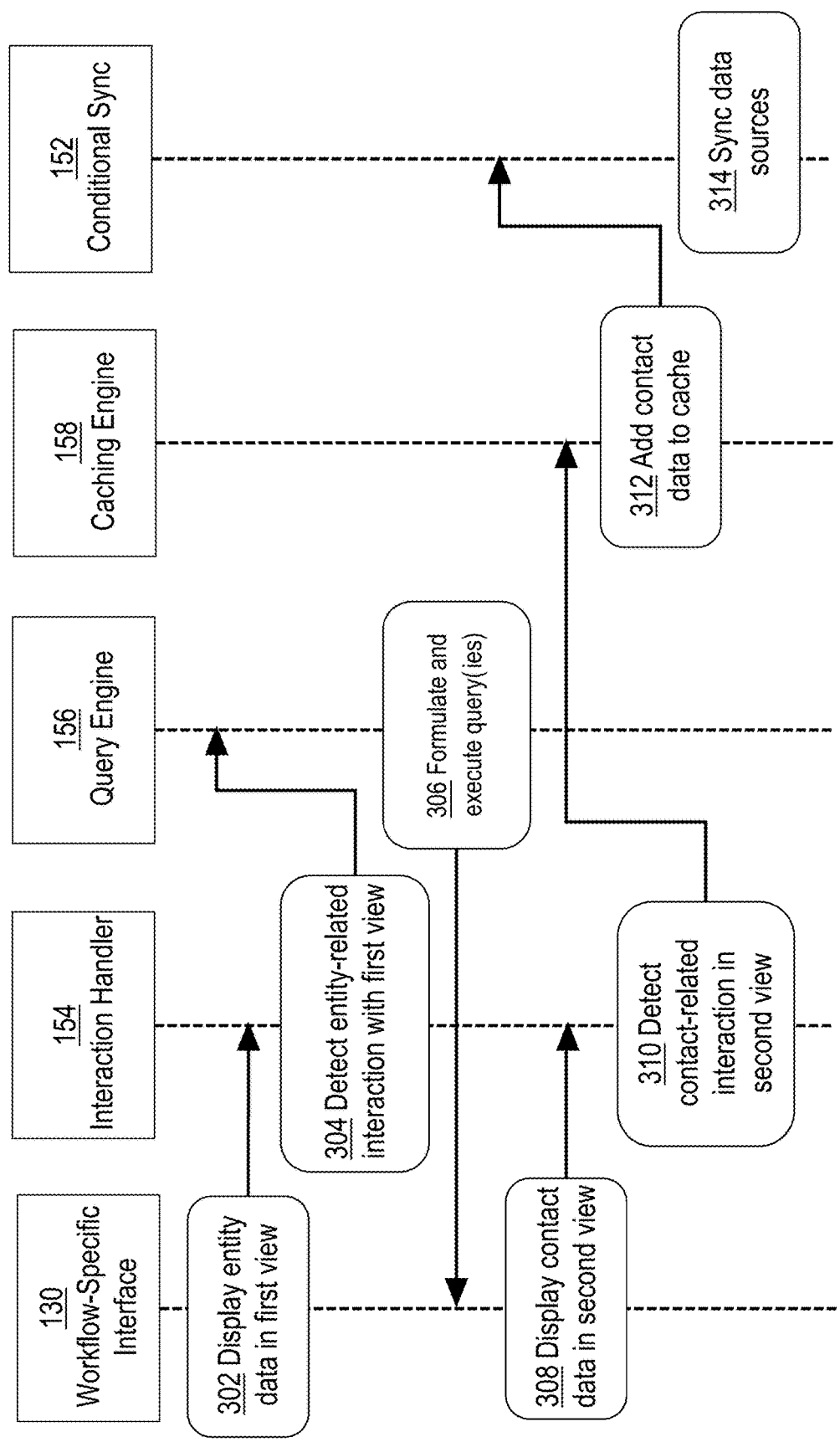
FIG. 3 is timing diagram that depicts interactions between components of the computing system of FIG. 1, in an embodiment.

FIG. 2 and FIG. 3 illustrate processes that can be performed by computing system 100. FIG. 2 is a flow diagram that depicts a process 200 for retrieving and processing data from multiple sources based on interactions with a graphical interface, in an embodiment. Process 200 may be performed by a single entity or program or by multiple entities or programs, including for example a browser plug-in and a remote server. The operations of the process as shown in FIG. 2 can be implemented using processor-executable instructions that are stored in computer memory. For purposes of providing a clear example, the operations of FIG. 2 are described as performed by computing device(s) 110, 140, which may be individually or collectively referred to as simply a 'computing system.'

Figure 4A:
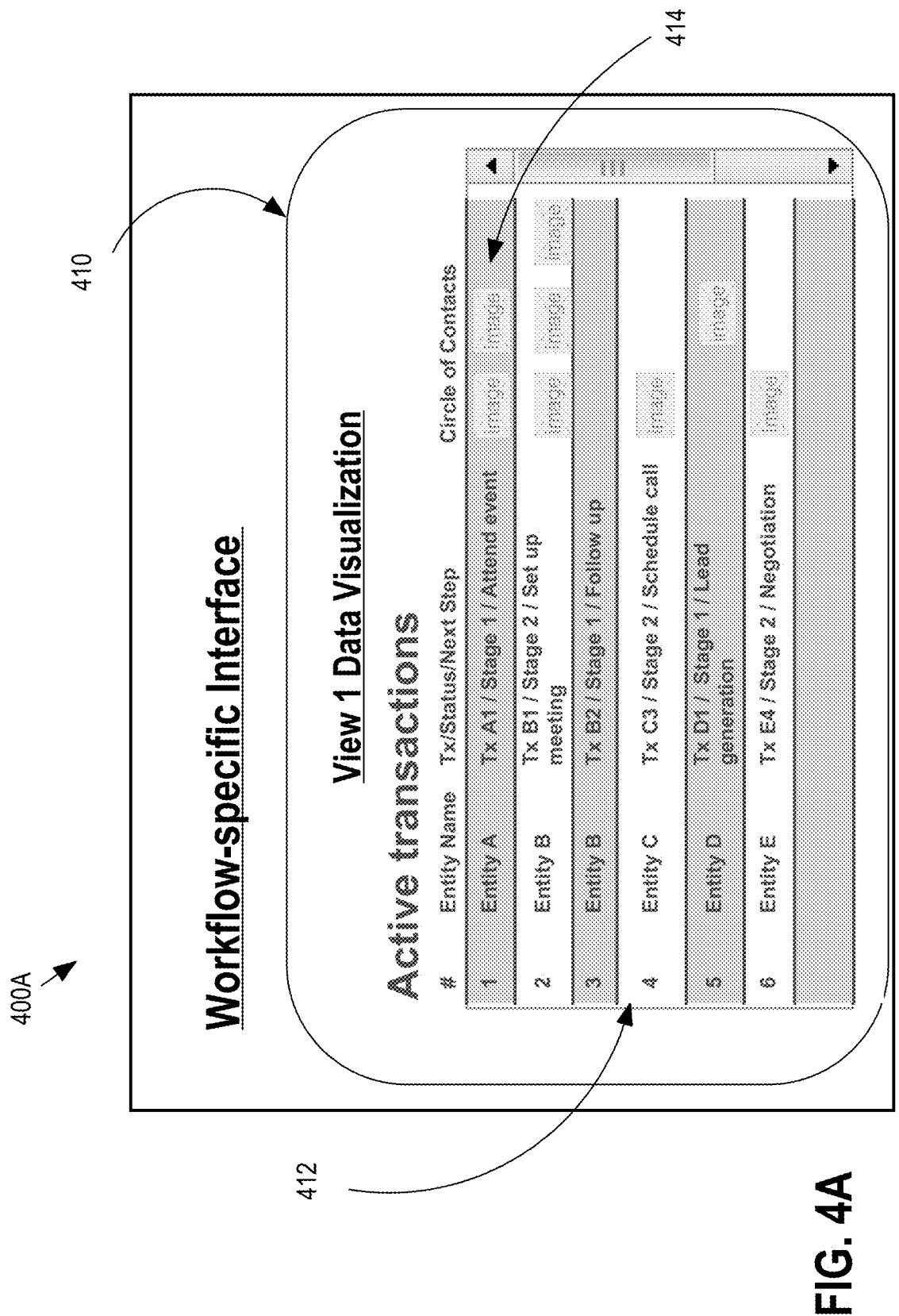
FIG. 4A is a screenshot of an example user interface that displays transaction-related information, where the information comes from multiple data sources, in an embodiment.

In operation 202, the computing system causes display of a first view (such as view 134) of data extracted from a data source (such as data source 104), which includes a display of status information associated with a prospective sales transaction involving a customer entity. The status information included in the display is retrieved by computing system executing a query on a subset of the data fields in data source 104. For instance, the information retrieved and displayed in the first view includes only certain fields or attributes of a table or data object in data source 104 that are associated with a workflow for which workflow-specific interface 130 is designed. An example of a first view that may be generated by operation 202 is shown in FIG. 4A, described below.

In operation 204, the computing system detects selection of an interactive element in the first view 134 that is displayed as a result of operation 202. Selection or activation of an interactive element can be detected by an input device of computing system, such as a touchscreen, a computer mouse, a keyboard or a microphone. In one example, the computing system may detect selection of a data value such as an attribute displayed in the view 134. An example of an attribute is a role of a contact at a business entity that is a prospective sales customer. Operation 204 may be performed by workflow-specific interface 130 cooperating with interaction handler 154.

In operation 206, computing system determines an entity identifier associated with the interactive element that was detected as selected by operation 204. Operation 206 may be performed by the computing system using data mapping specifications 160 to map the selected interactive element to the corresponding entity identifier. The entity identifier may be implemented as, for example, a numeric or alphanumeric label that may uniquely distinguish an entity data record from other entity data records in data source 104 and/or data source 108.

In operation 208, the computing system formulates and executes one or more queries to retrieve one or more sets of contact records associated with the entity identifier determined in operation 206, from at least two data sources. Operation 208 may be performed in response to detection by operation 204 of an interaction in workflow-specific interface 130 selecting an entity name and operation 206 determining a corresponding entity identifier. Operation 208 may be performed by workflow-specific interface 130 passing information about the detected interaction as parameter(s) to interaction handler 154. Interaction handler 154 interprets the interaction as an instruction to initiate one or more search queries. Interaction handler 154 passes the parameter(s) to contextualized query engine 156, which formulates and executes the one or more queries on, for example, data source 104 and data source 108 using, for example, a structured query language and/or APIs provided by transaction management system 102 and social network service 106. The workflow-specific interface 130 determines the user's intent (for example, add a role to a contact), and then query engine 156 translates that intent into the specific API calls/commands that are needed for each relevant data source. When more than one search query is formulated, the computing system can execute the multiple search queries concurrently.

As part of operation 208, the computing system may execute an operation 210 to identify the data sources from which to retrieve contact records. The identity or types of data sources can be considered by the computing system in determining the number of search queries that are needed. For instance, heterogeneous data sources may need to be searched using multiple separate queries.

In operation 212, the computing system generates the second view (for example, view 136), which includes a subset of the contact records retrieved in operation 208, and causes displaying of the new view by a display device of the computing system (for example, display device 170). The subset of the retrieved contact records may be constrained depending on one or more characteristics of the data sources, for instance to include only certain fields of data of the retrieved contact records or only specific contact records that are associated with certain roles in the transaction management system 102.

For example, the version of the contact records retrieved from data source 108 may include only the contact's published contact information, such as name and job title, in accordance with an applicable privacy policy or security policy. In another example, only contact records having a management-level title or higher may be retrieved and displayed in the second view. When contact records are retrieved from both data source 104 and data source 108, computing system may display the contact records from both data sources in the same view. For instance, a single window of the view may contain a list of contact records that includes contact records that were retrieved from data source 104 and contact records that were retrieved from data source 108.

In operation 214, the computing system determines whether an interaction is detected in the second view (the view of the subset of the retrieved contact records). When the computing system does not detect an interaction in the second view, the computing system may wait in operation 214 or end the process 200. When the computing system detects an interaction in the second view, the computing system proceeds to operation 216.

In operation 216, the computing system determines a role (of a number of different roles that may be associated with a transaction) to assign to a contact record associated with the interaction detected in operation 214, and causes the role to be assigned to the contact record. Computing system can determine the appropriate role to assign to the contact record based on an aspect of an interaction detected by interaction handler 154.

In one implementation, the detected interaction that results in assignment of a role to a contact record includes a drag-and-drop operation in the workflow-specific interface 130, in which a contact record is moved from one window of the second view to another window of the second view. In workflow-specific interface 130, the window that is the destination of the drag-and-drop operation is associated with a role. Thus, when interaction handler 154 detects presence of a contact record in the destination window, interaction handler 154 determines the role associated with the destination window and provides the role data to conditional sync module 152 for updating of data source 104.

Other implementations can use interaction techniques other than a drag-and-drop. Assignment of a role to the contact in the workflow-specific interface 130 automatically updates the corresponding contact record in data source 104 and the corresponding workflow in transaction management system 102. Transaction management system 102 may include a workflow tracking feature. When a workflow update is recorded in transaction management system 102, the workflow tracking feature can, for example, automatically mark a workflow task of 'assign role' as complete and suggest a next workflow task to be completed.

Concurrently with assignment of the role to the contact record, in operation 218, a version of the contact record including the role data is instantiated in a data source from which the contact record was not retrieved. For instance, if the contact record was retrieved from data source 108, then a new contact record including the role information generated by workflow-specific interface 130 is instantiated in data source 104. In this way, contact records retrieved from heterogeneous data sources can be integrated with, for example, centralized CRM data repositories and workflows.

In some embodiments, computing system can utilize a contact record obtained from data source 108 and a portion of the connection graph of social network service 106 to automatically generate a recommendation to integrate one or more other contact records in data source 108 with transaction management system 102. For instance, computing system may display in view 136 a list of suggested contact records that are retrieved from data source 108 because they have social graph connections in social network service 106 with a contact record that was previously retrieved from data source 108 (for example, by a search query).

FIG. 3 is a timing diagram that illustrates an example of functionality performed by and interactions between workflow-specific interface 130 and various modules of data/workflow integration system 150, in an embodiment. In operation 302, workflow-specific interface 130 causes display of entity data in first view 134. In operation 304, interaction handler 154 detects an entity-related interaction with the first view 134 (for example, selection of an entity name in the list of entity data by detection of a tap on a touchscreen or a mouse click on the entity name). In operation 306, contextualized query engine 156 formulates and executes one or more search queries on a CRM data source and one or more non-CRM data sources, using the entity data associated with the interaction detected by interaction handler 154 in operation 304 as part of the query (for instance, as a search term or a filter).

In operation 308, workflow-specific interface 130 displays, in second view 136, contact data retrieved from data source 108 by query engine 156 in response to execution of the query by operation 306. In operation 310, interaction handler 154 detects a contact-related interaction in second view 136. For example, interaction handler 154 may detect a user interface operation in which a contact record is graphically dragged from one window to another window in second view 136. Interaction handler 154 determines metadata associated with the window into which the contact record is dragged and passes the metadata to conditional sync module 152.

In operation 312, caching engine 158 adds contact data associated with the interaction detected in operation 310 (including destination window metadata, such as role information) to cache memory. Caching engine 158 may be implemented using, for example, a layered caching technique. In operation 314, conditional sync module 152 synchronizes data source 104 with the data displayed in workflow-specific interface 130 by causing the contact data cached in operation 312 to be moved out of the cache memory and into data source 104.

Use Case: Contextualizing a Display of Contact Information

As a specific example, FIG. 4A is a screenshot 400A of a user interface that may be displayed as first view 134 of workflow-specific interface 130. Screenshot 400A includes a data display window 410, which includes a table 412. Table 412 displays a subset of transaction-related data extracted from data source 104. The illustrative transaction-related data includes, for an individual transaction, an entity name, transaction status information, and one or more thumbnail images 414 in a 'circle of contacts' that is associated with the entity and the transaction. Each thumbnail image 414 corresponds to a contact record of a contact that has been assigned a role with respect to the given transaction.

For example, transaction #1 involves an entity named Entity A and there are two contacts at Entity A who are involved in and have been assigned roles with respect to transaction #1. Selection by an input device of an attribute of an entity displayed in the display window 410 (for example, selecting the 'circle of contacts' for a given 'opportunity') causes computing system to generate and display a list of contacts that are associated with the selected entity, such as in view 136. Limiting the display of window 410 to only the list of contacts that have an association with the selected entity can improve the efficiency of the computing system by reducing the amount of data needing to be retrieved and displayed, and can simplify the role assignment processes by causing to display only those contact records that are likely candidates for role assignments. In some implementations, creating the list of contacts filtered by entity name can be performed by proper design of the search query to, for example, join two different tables of two different data sources 104, 108.

Figure 4B:
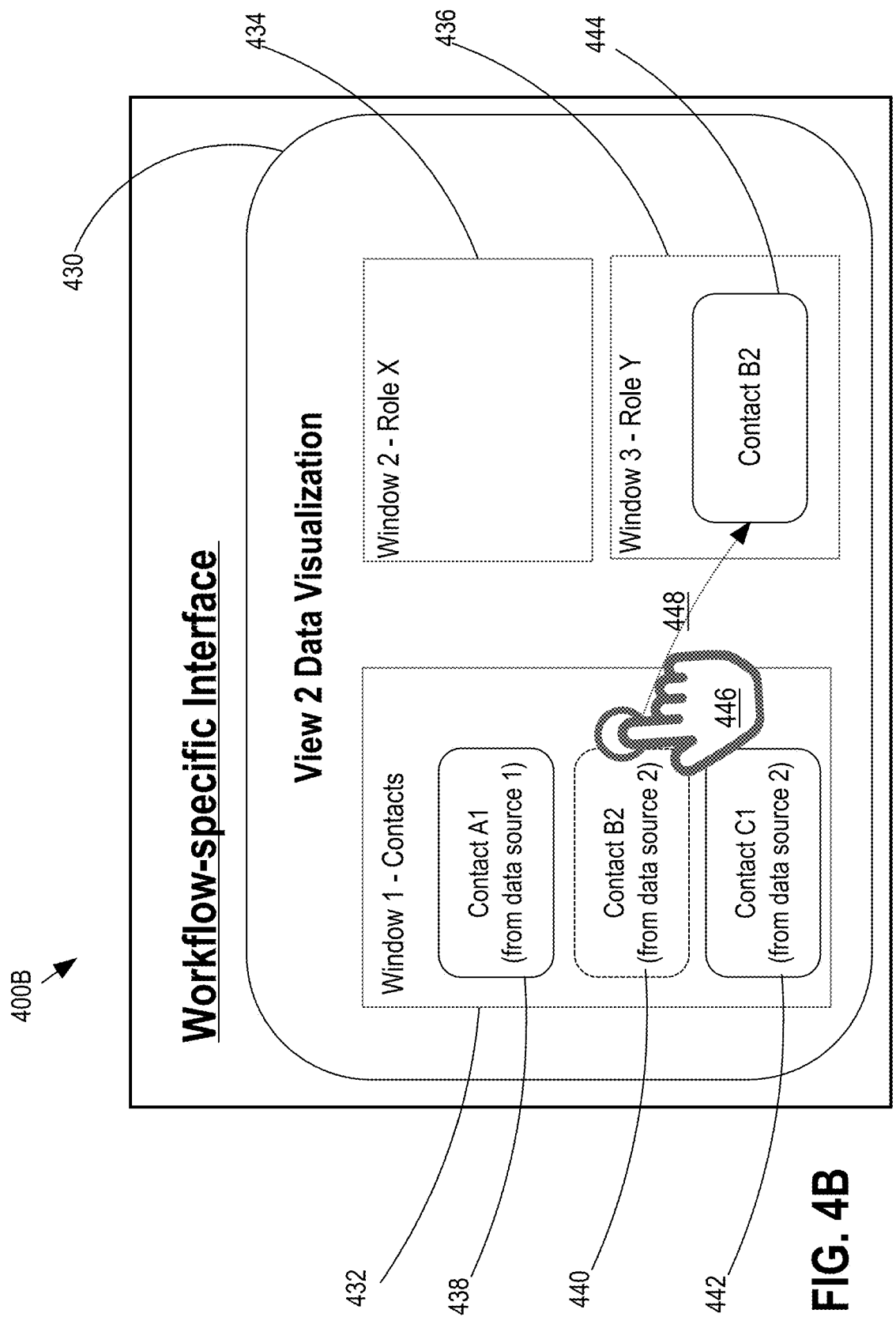
FIG. 4B is a screenshot of a portion of a user interface after a viewer selects a graphical element, in an embodiment.

Use Case: Concurrently Assigning a Non-CRM Contact Record to a Role and Adding the Contact to a CRM Database As another specific example, FIG. 4B is a screenshot 400B of a user interface that may be displayed when a computing system detects selection of an entity name in FIG. 4A. Screenshot 400B includes an interactive area 430. Interactive area 430 includes a contacts window 432 and role windows 434, 444. Contacts window 432 is populated with contact records retrieved from both data source 104 (contact record 438) and data source 108 (contact records 440, 442). Role windows 434, 444 are initially not populated with any contact records.

Graphic 446 is used to represent a drag-and-drop operation and may or may not be visually depicted as part of the screenshot 400B. If a drag-and-drop operation selects a contact record from window 432 and the contact record was retrieved from data source 108, then when the drag-and-drop operation moves the selected contact record (here, contact record 440) out of contacts window 432 and into a destination role window (here, window 436), computing system performs operations to both assign the role associated with the destination role window (here, Role Y) to the contact record and create a new contact record in data source 104 that contains the newly assigned role data as well as other information from the source contact record (here, contact record 440). The functionality illustrated by FIG. 4B can improve the efficiency of computing the system by reducing the number of computer operations, reducing the number of interactions with workflow-specific interface 130, or by combining data record creation and attribute assignment into a single computer operation.

Benefits

Benefits that may be realized by at least some embodiments described herein include enhancing the integration of social network connections with CRM system databases by automatically associating the social network contacts with CRM workflows (such as by assigning roles to contact records obtained from the social network), and 'closing the loop' by automatically updating a centralized CRM database with information that is generated and collected downstream as a result of executing workflows but which is not frequently entered into the CRM system.

Implementation Example—Hardware Overview

According to one embodiment, the techniques described herein are implemented by one or more computing devices. For example, portions of the disclosed technologies may be at least temporarily implemented on a network including a combination of one or more server computers and/or other computing devices. The computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such computing devices may also combine custom hard-wired logic, ASICs, or FPGAs with custom programming to accomplish the described techniques.

The computing devices may be server computers, personal computers, or a network of server computers and/or personal computers. Illustrative examples of computers are desktop computer systems, portable computer systems, handheld devices, mobile computing devices, wearable devices, body mounted or implantable devices, smart phones, smart appliances, networking devices, autonomous or semi-autonomous devices such as robots or unmanned ground or aerial vehicles, or any other electronic device that incorporates hard-wired and/or program logic to implement the described techniques.

Figure 5:
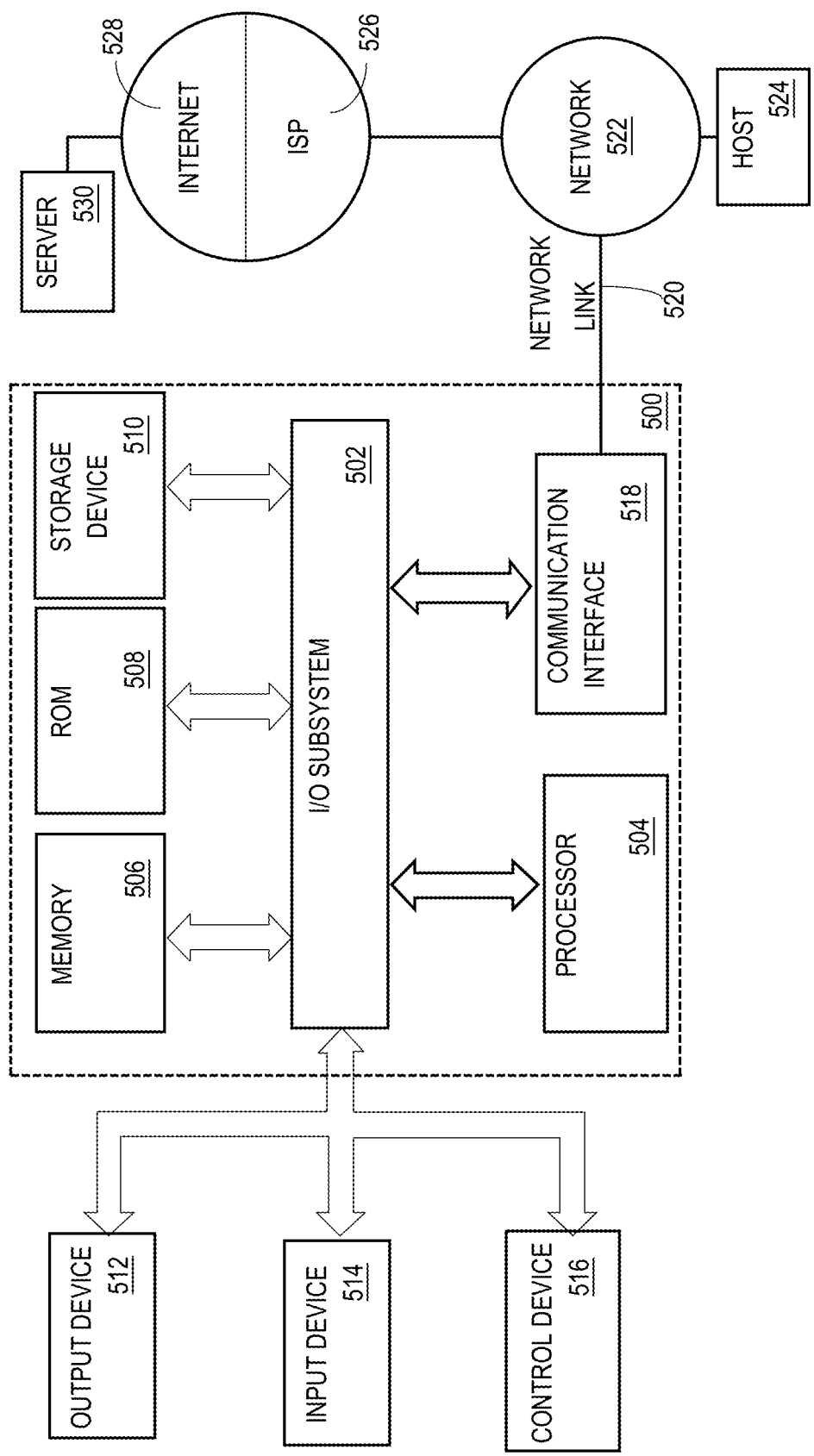
FIG. 5 is a block diagram that illustrates a computer system upon which an embodiment of the invention may be implemented.

For example, FIG. 5 is a block diagram that illustrates a computer system 500 upon which an embodiment of the present invention may be implemented. Components of the computer system 500, including instructions for implementing the disclosed technologies in hardware, software, or a combination of hardware and software, are represented schematically in the drawings, for example as boxes and circles.

Computer system 500 includes an input/output (I/O) subsystem 502 which may include a bus and/or other communication mechanism(s) for communicating information and/or instructions between the components of the computer system 500 over electronic signal paths. The I/O subsystem may include an I/O controller, a memory controller and one or more I/O ports. The electronic signal paths are represented schematically in the drawings, for example as lines, unidirectional arrows, or bidirectional arrows.

One or more hardware processors 504 are coupled with I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor.

Computer system 500 also includes a memory 506 such as a main memory, which is coupled to I/O subsystem 502 for storing information and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 further includes a non-volatile memory such as read only memory (ROM) 508 or other static storage device coupled to I/O subsystem 502 for storing static information and instructions for processor 504. The ROM 508 may include various forms of programmable ROM (PROM) such as erasable PROM (EPROM) or electrically erasable PROM (EEPROM). A persistent storage device 510 may include various forms of non-volatile RAM (NVRAM), such as flash memory, or solid-state storage, magnetic disk or optical disk, and may be coupled to I/O subsystem 502 for storing information and instructions.

Computer system 500 may be coupled via I/O subsystem 502 to one or more output devices 512 such as a display device. Display 512 may be embodied as, for example, a touch screen display or a light-emitting diode (LED) display or a liquid crystal display (LCD) for displaying information, such as to a computer user. Computer system 500 may include other type(s) of output devices, such as speakers, LED indicators and haptic devices, alternatively or in addition to a display device.

One or more input devices 514 is coupled to I/O subsystem 502 for communicating signals, information and command selections to processor 504. Types of input devices 514 include touch screens, microphones, still and video digital cameras, alphanumeric and other keys, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be implemented as a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

Computer system 500 may implement the techniques described herein using customized hard-wired logic, one or more ASICs or FPGAs, firmware and/or program logic which in combination with the computer system causes or programs computer system 500 to operate as a special-purpose machine. According to one embodiment, the techniques herein are performed by computer system 500 in response to processor 504 executing one or more sequences of one or more instructions contained in memory 506. Such instructions may be read into memory 506 from another storage medium, such as storage device 510. Execution of the sequences of instructions contained in memory 506 causes processor 504 to perform the process steps described herein. In alternative embodiments, hard-wired circuitry may be used in place of or in combination with software instructions.

The term "storage media" as used in this disclosure refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage device 510 either before or after execution by processor 504.

Computer system 500 also includes a communication interface 518 coupled to bus 502. Communication interface 518 provides a two-way data communication coupling to network link(s) 520 that are directly or indirectly connected to one or more communication networks, such as a local network 522 or a public or private cloud on the Internet. For example, communication interface 518 may be an integrated-services digital network (ISDN) card, cable modem, satellite modem, or a modem to provide a data communication connection to a corresponding type of communications line, for example a coaxial cable or a fiber-optic line or a telephone line. As another example, communication interface 518 may include a local area network (LAN) card to provide a data communication connection to a compatible LAN. Wireless links may also be implemented. In any such implementation, communication interface 518 sends and receives electrical, electromagnetic or optical signals over signal paths that carry digital data streams representing various types of information.

Network link 520 typically provides electrical, electromagnetic, or optical data communication directly or through one or more networks to other data devices, using, for example, cellular, Wi-Fi, or BLUETOOTH technology. For example, network link 520 may provide a connection through a local network 522 to a host computer 524 or to other computing devices, such as personal computing devices or Internet of Things (IoT) devices and/or data equipment operated by an Internet Service Provider (ISP) 526. ISP 526 provides data communication services through the world-wide packet data communication network commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

Additional Examples

Illustrative examples of the technologies disclosed herein are provided below. An embodiment of the technologies may include any of the examples or a combination of the described below.

In an example 1, a system includes one or more processors; one or more storage media storing instructions which, when executed by the one or more processors, cause causing a display device to display a first view that includes status information associated with a prospective transaction involving an entity; detecting selection of an interactive element in the first view; determining an entity identifier associated with the interactive element; using the entity identifier, formulating a first query to retrieve a first set of contact records from a first data source accessible over a communication network; using the entity identifier, formulating a second query to retrieve a second set of contact records from a second data source accessible over the communication network, wherein the first and second data sources are heterogeneous data sources; executing the first query and the second query; causing to display, by the display device, a second view that includes a subset of the first set of contact records and a subset of the second set of contact records; detecting an interaction involving the second view; based on the interaction, assigning, to a contact record in the subset, a role of a plurality of roles associated with the prospective transaction; determining whether the contact record was retrieved from the first data source or the second data source; in response to determining that the contact record was retrieved from the second data source, assigning the role to the contact record; and instantiating a version of the contact record in the first data source using data obtained from the second data source.

An example 2 includes the subject matter of example 1, wherein the instructions, when executed by the one or more processors, further cause displaying in the first view, a thumbnail image that is associated with the contact record that has been assigned to the role in the second view. An example 3 includes the subject matter of example 1 or example 2, wherein detecting the interaction includes detecting a drag-and-drop operation involving the contact record and a window in the second view. An example 4 includes the subject matter of any of examples 1-3, wherein executing the first query includes searching the first data source, wherein the first data source includes a searchable compilation of data relating to a plurality of prospective transactions involving a plurality of different entities. An example 5 includes the subject matter of any of examples 1-4, wherein executing the second query includes searching the second data source, wherein the second data source includes an online social network of contact data arranged according to a connection graph. An example 6 includes the subject matter of any of examples 1-5, wherein the instructions, when executed by the one or more processors, further cause using the contact data and the connection graph to determine a suggested contact record and cause displaying a version of the suggested contact record in the second view. An example 7 includes the subject matter of any of examples 1-6, wherein the instructions, when executed by the one or more processors, further cause displaying a plurality of windows in the second view, wherein each window in the plurality of windows is associated with a different role of a plurality of roles to which contact records may be assigned. An example 8 includes the subject matter of any of examples 1-7, wherein the instructions, when executed by the one or more processors, further cause displaying, in the first view, a set of thumbnail images associated with contact records that include role data and are associated with the entity identifier. An example 9 includes the subject matter of any of examples 1-4, wherein instantiating the version of the contact record in the first data source includes extracting data from the second data source in accordance with a security policy or a privacy policy.

In an example 10, one or more non-transitory computer-readable storage media comprising instructions which, when executed by one or more processors, cause detecting selection of an entity identifier in a first view of status information associated with an entity involved in a transaction, wherein the first view is displayed in a display device; using the entity identifier, formulating a query to retrieve a set of contact records from a first data source accessible over a communication network; executing the query; causing, to be displayed by the display device, a second view that includes the set of contact records; detecting an interaction in the second view; in response to the interaction: assigning a role to a contact record of the displayed contact records; instantiating a version of the contact record in a second data source that is different than the first data source and that is coupled to the communication network.

An example 11 includes the subject matter of example 10, wherein executing the query includes searching contact data arranged according to a connection graph. An example 12 includes the subject matter of example 11, wherein the instructions, when executed by the one or more processors, further cause using the searching of the connection graph to identify the contact record and cause displaying a version of the contact record in the second view.

In an example 13, a method includes: causing, to be displayed by a display device, a first view that includes status information associated with a prospective transaction involving an entity; detecting selection of an interactive element in the first view; determining an entity identifier associated with the interactive element; using the entity identifier, formulating a first query to retrieve a first set of contact records from a first data source accessible over a communication network; using the entity identifier, formulating a second query to retrieve a second set of contact records from a second data source accessible over the communication network, wherein the first and second data sources are heterogeneous data sources; concurrently executing the first query and the second query; causing to be displayed, by the display device, a second view that includes a subset of the first set of contact records and a subset of the second set of contact records; detecting an interaction in the second view; based on the interaction, assigning, to a contact record in the subset, a role of a plurality of roles associated with the prospective transaction; determining whether the contact record was retrieved from the first data source or the second data source; in response to determining that the contact record was retrieved from the second data source, assigning of the role to the contact record, instantiating a version of the contact record in the first data source using data obtained from the second data source, wherein the method is performed by one or more computing devices.

An example 14 includes the subject matter of example 13, and includes causing to be displayed in the first view, a thumbnail image that is associated with the contact record that has been assigned to the role in the second view. An example 15 includes the subject matter of example 13 or example 14, wherein detecting the interaction includes detecting a drag-and-drop operation involving the contact record and a window in the second view. An example 16 includes the subject matter of any of examples 13-15, wherein executing the first query includes searching the first data source, wherein the first data source includes a searchable compilation of data relating to a plurality of prospective transactions involving a plurality of different entities. An example 17 includes the subject matter of any of examples 13-16, wherein executing the second query includes searching the second data source, wherein the second data source includes contact data arranged according to a connection graph. An example 18 includes the subject matter of any of examples 13-17, and includes causing to be displayed a plurality of windows in the second view, wherein each window in the plurality of windows is associated with a different role of a plurality of roles to which contact records may be assigned. An example 19 includes the subject matter of any of examples 13-18, and includes causing to be displayed, in the first view, a set of thumbnail images associated with contact records that include role data and are associated with the entity identifier. An example 20 includes the subject matter of any of examples 13-19, wherein instantiating the version of the contact record in the first data source includes extracting data from the second data source in accordance with a security policy or a privacy policy.

General Considerations

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used in this disclosure the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to effect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
   one or more processors;
   one or more storage media storing instructions which, when executed by the one or more processors, cause:
   causing a display device to display a first view that comprises status information associated with a transaction involving an entity;
   detecting selection of an interactive element in the first view;
   determining an entity identifier associated with the interactive element;
   using the entity identifier, formulating a first query to retrieve a first set of contact records from a customer relationship management (CRM) system data source accessible over a communication network;
   using the entity identifier, formulating a second query to retrieve a second set of contact records from a social network data source accessible over the communication network;
   executing the first query on the CRM system data source and the second query on the social network data source;
   causing the display device to display a second view that comprises at least one contact record of the first set of contact records and at least one contact record of the second set of contact records;
   detecting an interaction involving a contact record of the second view and a role window;
   based on the interaction, determining metadata associated with the role window;
   based on the metadata, assigning, to the contact record, a role of a plurality of roles associated with the transaction;
   determining whether the contact record was retrieved from the social network data source or the CRM system data source;
   in response to determining that the contact record was retrieved from the social network data source, instantiating a version of the contact record in the CRM system data source using data obtained from the social network data source and data associated with the role assigned to the contact record based on the metadata;
   in response to determining that the contact record was retrieved from the CRM system data source, updating the contact record in the CRM data source to include data associated with the role assigned to the contact record based on the metadata.

2. The system of claim 1, wherein the instructions, when executed by the one or more processors, further cause displaying, in the first view, a thumbnail image that is associated with the contact record that has been assigned to the role in the second view.

3. The system of claim 1, wherein detecting the interaction comprises detecting a drag-and-drop operation involving the contact record and a window in the second view.

4. The system of claim 1, wherein executing the first query comprises searching the CRM system data source, wherein the CRM system data source comprises a searchable compilation of data relating to a plurality of prospective transactions involving a plurality of different entities.

5. The system of claim 1, wherein executing the second query comprises searching the social network data source, wherein the social network data source comprises an online social network of contact data arranged according to a connection graph.

6. The system of claim 5, wherein the instructions, when executed by the one or more processors, further cause using the contact data and the connection graph to determine a suggested contact record and cause displaying a version of the suggested contact record in the second view.

7. The system of claim 1, wherein the instructions, when executed by the one or more processors, further cause displaying a plurality of windows in the second view, wherein each window in the plurality of windows is associated with a different role of a plurality of roles to which contact records may be assigned.

8. The system of claim 1, wherein the instructions, when executed by the one or more processors, further cause displaying, in the first view, a set of thumbnail images associated with contact records that include role data and are associated with the entity identifier.

9. The system of claim 1, wherein instantiating the version of the contact record in the CRM system data source comprises extracting data from the social network data source in accordance with a security policy or a privacy policy.

10. One or more non-transitory computer-readable storage media comprising instructions which, when executed by one or more processors, cause:
  detecting selection of an entity identifier in a first view of status information associated with an entity involved in a transaction, wherein the first view is displayed by a display device;
  using the entity identifier, formulating a query to retrieve a set of contact records from a first data source accessible over a communication network;
  executing the query;
  causing, to be displayed by the display device, a second view that comprises the set of contact records;
  detecting an interaction involving a contact record of the set of contact records in the second view and a role window;
  based on the interaction, determining metadata associated with the role window;
  based on the metadata, assigning, to the contact record, a role of a plurality of roles associated with the transaction;
  determining whether the contact record was retrieved from a first data source or a second data source;
  in response to determining that the contact record was retrieved from the first data source, instantiating a version of the contact record in the second data source using data obtained from the first data source and data associated with the role assigned to the contact record based on the metadata;
  in response to determining that the contact record was retrieved from the second data source, updating the contact record in the second data source to include data associated with the role assigned to the contact record based on the metadata.

11. The one or more non-transitory computer-readable storage media of claim 10, wherein executing the query comprises searching contact data arranged according to a connection graph.

12. The one or more non-transitory computer-readable storage media of claim 11, wherein the instructions, when executed by the one or more processors, further cause using the searching of the connection graph to identify the contact record and cause displaying a version of the contact record in the second view.

13. A method comprising:
  causing to display, by a display device, a first view that comprises status information associated with a transaction involving an entity;
  detecting selection of an interactive element in the first view;
  determining an entity identifier associated with the interactive element;
  using the entity identifier, formulating a first query to retrieve a first set of contact records from a first data source accessible over a communication network;
  using the entity identifier, formulating a second query to retrieve a second set of contact records from a second data source accessible over the communication network, wherein the first data source and the second data source are heterogeneous data sources;
  executing the first query on the first data source and the second query on the second data source;
  causing to display, by the display device, a second view that comprises at least one contact record of the first set of contact records and at least one contact record of the second set of contact records;
  detecting an interaction involving a contact record in the second view and a role window;
  based on the interaction, determining metadata associated with the role window;
  based on the metadata, assigning, to the contact record, a role of a plurality of roles associated with the transaction;
  determining whether the contact record was retrieved from the first data source or the second data source;
  in response to determining that the contact record was retrieved from the second data source, instantiating a version of the contact record in the first data source using data obtained from the second data source and and data associated with the role assigned to the contact record based on the metadata;
  in response to determining that the contact record was retrieved from the first data source, updating the contact record in the first data source to include data associated with the role assigned to the contact record based on the metadata;
  wherein the method is performed by one or more computing devices.

14. The method of claim 13, comprising causing to display, in the first view, a thumbnail image that is associated with the contact record that has been assigned to the role in the second view.

15. The method of claim 13, wherein detecting the interaction comprises detecting a drag-and-drop operation involving the contact record and a window in the second view.

16. The method of claim 13, wherein executing the first query comprises searching the first data source, wherein the first data source comprises a searchable compilation of data relating to a plurality of prospective transactions involving a plurality of different entities.

17. The method of claim 13, wherein executing the second query comprises searching the second data source, wherein the second data source comprises contact data arranged according to a connection graph.

18. The method of claim 13, comprising causing to display a plurality of windows in the second view, wherein each window is associated with a different role of a plurality of roles to which contact records may be assigned.

19. The method of claim 13, comprising causing to display, in the first view, a set of thumbnail images associated with contact records that include role data and are associated with the entity identifier.

20. The method of claim 13, wherein instantiating the version of the contact record in the first data source comprises extracting data from the second data source in accordance with a security policy or a privacy policy.

* * * * *